US006708218B1

United States Patent
Ellington, Jr. et al.

(10) Patent No.: US 6,708,218 B1
(45) Date of Patent: Mar. 16, 2004

(54) IPSEC PERFORMANCE ENHANCEMENT USING A HARDWARE-BASED PARALLEL PROCESS

(75) Inventors: William Woollcott Ellington, Jr., Raleigh, NC (US); Charles Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 09/587,689

(22) Filed: Jun. 5, 2000

(51) Int. Cl.[7] .............................................. G06F 15/16
(52) U.S. Cl. ...................... 709/236; 709/230; 709/238; 709/239; 709/240
(58) Field of Search .............................. 709/230, 238, 709/239, 240, 236

(56) References Cited

U.S. PATENT DOCUMENTS

| | | | |
|---|---|---|---|
| 5,655,140 A | 8/1997 | Haddock | 395/200.76 |
| 5,691,985 A | 11/1997 | Lorenz et al. | 370/401 |
| 5,706,489 A | 1/1998 | Chi et al. | 395/569 |
| 5,758,070 A | 5/1998 | Lawrence | 395/200.5 |
| 5,796,944 A | 8/1998 | Hill et al. | 395/200.8 |
| 5,878,229 A | 3/1999 | Bass et al. | 395/200.66 |
| 5,889,863 A | 3/1999 | Weber | 380/25 |
| 5,898,784 A | 4/1999 | Kirby et al. | 380/49 |
| 6,327,625 B1 * | 12/2001 | Wang et al. | 709/235 |
| 6,449,723 B1 * | 9/2002 | Elgressy et al. | 713/201 |
| 6,505,192 B1 * | 1/2003 | Godwin et al. | 707/3 |
| 6,539,483 B1 * | 3/2003 | Harrison et al. | 713/201 |
| 2001/0047487 A1 * | 11/2001 | Linnakangas et al. | 713/201 |
| 2003/0014627 A1 * | 1/2003 | Krishna et al. | 713/153 |

* cited by examiner

*Primary Examiner*—Saleh Najjar
(74) *Attorney, Agent, or Firm*—Bracewell & Patterson LLP; Martin Mckinley

(57) ABSTRACT

A hardware function performed in the data link control layer first determines if a received frame is an IP frame requiring IPSec processing, and if it is, places the IPSec frame on a separate receive queue for subsequent inbound processing. The hardware function further determines if a frame to be transmitted is an IP frame requiring IPSec outbound processing, and if it is, places the IPSec frame on a separate transmit queue for subsequent outbound processing. To determine if an IP frame is an IPSec frame, the hardware function examines both the type field in the Medium Access Control (MAC) header and the protocol field in the IP header, both at the data link control layer. Once IPSec and non-IPSec traffic are separated at the data link layer into different receive or transmit queues, a hardware assist component processes the IPSec data frames in parallel with the processing of non-IPSec data frames by the processor in the network device. The hardware assist component performs the IPSec functions of encryption and decryption, security association management, and key exchange.

37 Claims, 11 Drawing Sheets

802.2/802.3 FRAMES (RFC 1042)

| 802.3 MAC HEADER 14 BYTES | 802.2 LLC HEADER 3 BYTES | 802.2 SNAP HEADER 4TH AND 5TH BYTES - TYPE FIELD - VALUE OF x'0800' | IP HEADER - 10TH BYTE - PROTOCOL FIELD - VALUE OF 50 OR 51 |

FIG. 10A

ETHERNET FRAMES (RFC 894)

| MAC HEADER 13 AND 14TH BYTES - TYPE FIELD VALUE OF X'0800' | IP HEADER - 10TH BYTE - PROTOCOL FIELD - VALUE OF 50 OR 51 |

FIG. 10B

TOKEN-RING FRAMES (802.5)

| MAC HEADER 14 BYTES | 802.2 LLC HEADER 3 BYTES | 802.2 SNAP HEADER 4TH AND 5TH BYTES - TYPE FIELD - VALUE OF X'800' | IP HEADER - 10TH BYTE - PROTOCOL FIELD - VLAUE OF 50 OR 51 |

FIG. 10C

IPSEC PERFORMANCE ENHANCEMENT USING A HARDWARE-BASED PARALLEL PROCESS

CROSS-REFERENCE TO RELATED APPLICATIONS

This patent application is related to, and contains common disclosure with, and commonly assigned patent applications "Apparatus, Method and System for Secure Tunnel Ping and Message Format for Use Therein", Ser. No. 09/438,119, filed Nov. 10, 1999, and "Performance Enhancement for IPSec Traffic for Network Interface Connections", serial number (Attorney Docket RAL9-1999-0046US1). The patent applications are hereby incorporated by reference into this description as fully as if here represented in full.

BACKGROUND OF THE INVENTION

The present invention relates to improvements in the systems and methods for communicating in an environment including at least one secure tunnel (such as is sometimes referred to as Internet Protocol Security or "IPSec" herein and in the industry and its standards activity). More particularly, the present invention relates to an improved system and method for performance enhancement for IPSec data traffic in an IP networking environment using a hardware based parallel process.

Communications systems involve a variety of devices which are connected to a data transmission network, often through a variety of conventional devices such as routers, switches and other components. As the networks have become larger, incorporating local area networks (LANs) and wide-area networks (WANs), these networks have become more complex and involve an increasing number of components. One of the largest networks is referred to as the Internet, a constantly-changing communications network including a large number of interconnected network devices or workstations.

In addition, many companies are now employing Internet technologies to build private intranets, enabling users in an organization to go beyond electronic mail and access critical data through web browsers. While Intranet traffic is currently composed primarily of text, graphics and images, this traffic is expected to expand in the near term to include more bandwidth-intensive audio, video, voice and multimedia applications.

As applications proliferate and demand ever greater shares of bandwidth at the desktop and as the total number of users continues to grow, the pressure for increased bandwidth will continue to grow at the desktop, the server, the hub, and the switch. Organizations will need to migrate critical portions of their networks to higher bandwidth technologies, such as Gigabit Ethernet, Fast Ethernet, Gigabit Token-Ring, and High Speed Token Ring.

Communications on the Internet presents additional problems because of the size of the network and because communications are not handled in a uniform manner—a first packet between two devices may be sent over one route and a completely different path may be used for a second packet, even when both packets are part of the same message. Furthermore, the Internet is inherently unsecure. As security techniques are defined to add security to the Internet, these techniques often conflict with the techniques which have been in common use.

As organizations such as the Internet Engineering Task Force (IETF) define techniques for reducing the security exposures of Internet communications, security concepts such as IP Security (IPSec) have been proposed. IPSec is a developing standard for security at the network or packet processing layer of network communications. Earlier security approaches inserted security at the application layer of the communications model. IPSec is especially useful for implementing virtual private networks and for remote user access through dial-up connection to private networks. A big advantage of IPSec is that security arrangements can be handled without requiring changes to individual user computers. IPSec provides two choices of security service: Authentication Header (AH), which allows authentication of a sender of data, and Encapsulating Security Payload (ESP) which supports both authentication of the sender and, encryption of data as well. The specific information associated with each of these services is inserted into the packet in a header that follows the IP packet header. Separate key protocols can be selected such as the ISAKMP/Oakley protocol.

Tunneling or encapsulation is a common technique in packet-switched networks. It consists of wrapping a packet in a new one. That is, a new header is attached to the original packet. The entire original packet becomes the payload of the new one. In general, tunneling is used to carry traffic of one protocol over a network that does not support that protocol directly. For example, NetBIOS or IPX can be encapsulated in IP to carry it over a Transmission Control Protocol/Internet Protocol (TCP/IP) wide area network (WAN) link. In the case of IPSec, IP is tunneled through IP for a slightly different purpose, i.e., to provide total protection, including the header of the encapsulated packet. If the encapsulated packet is encrypted, an intruder cannot figure out the destination address of that packet. Without tunneling the intruder could. The internal structure of a private network can be concealed in this manner.

A notable advantage of IP tunneling is the possibility to exchange packets with private IP addresses between two intranets over the public Internet, which requires globally unique addresses. Since the encapsulated header is not processed by the Internet routers, only the end points of the tunnel (the gateways) need to have globally assigned addresses; the hosts and the intranets behind them can be assigned private addresses. As globally unique IP addresses are becoming a scarce resource, this interconnection method gains importance.

IPSec can be configured to create tunnels in two modes:
1. Tunnel mode—in which the protocol data unit (PDU) is encapsulated within another IP frame and an outermost IP address is added. This address is the address of the tunnel termination device.
2. Transport mode—in which the PDU is not encapsulated and the existing (outermost) IP address is used. This address is the address of the tunnel termination device.

Note that in IPSec terminology, the word tunnel is used to describe both a mode of operation, i.e., tunnel mode (a new header is created to encapsulate the original IP frame), or transport mode (no new header is created).

Traffic which uses the IP security extensions (commonly known as IPSec) to IP Protocol version 4 (IPv4) and later versions such as IP version 6 (IPv6) require very significant processing for key exchanges and for encryption and de-encryption. This large processing requirement significantly reduces system performance. In practice, IPSec data traffic will be intermixed with other data traffic, requiring the network layer to determine if the frame is an IP frame and then have the IP layer determine if the frame is an IPSec frame, and if so, perform the additional processing required prior to the normal IP processing.

SUMMARY OF THE INVENTION

It is an object of the present invention to provide a system and method for the enhanced processing of IPSec and non-IPSec data frames in data traffic having both types of data frames intermixed using a hardware-based parallel process.

It is another object of the present invention to perform preprocessing of incoming data frames using a hardware assist component for IPSec data frames to reduce the average processing time of inbound data traffic having intermixed data frames.

It is another object of the present invention to perform postprocessing of outbound data traffic using a hardware assist component for IPSec data frames to reduce the average processing time of outbound data traffic having intermixed data frames.

These and other objects and advantages of the present invention are achieved by the present invention in which data frames including security extensions are processed initially by the same hardware and software that is used to process data frames without a security extension. Outbound traffic using IPSec security extensions are encrypted and encapsulated using a hardware IPSec assist component before transmission through an IPSEC outbound tunnel, such as is used in Virtual Private Networks (VPNs). This encryption and encapsulation is referred to as postprocessing and is processing intensive. Inbound traffic using security extensions is decapsulated and decrypted using the hardware IPSec assist component after reception through an IPSec inbound tunnel. This decapsulation and decryption is referred to as preprocessing and is also processing intensive. The present invention utilizes a hardware function performed in the data link control layer and described in co-pending application "Performance Enhancement for IPSec Traffic for Network Interface Connections" to determine if a received frame is an IP frame requiring IPSec processing, and if it is, to place the IPSec frame on a separate receive queue for subsequent inbound processing. The present invention further utilizes the hardware function to determine if a frame to be transmitted is an IP frame requiring IPSec outbound processing, and if it is, places the IPSec frame on a separate transmit queue for subsequent outbound processing. To determine if an IP frame is an IPSec frame, the type field in the Medium Access Control (MAC) header and the protocol field in the IP header are examined at the data link control layer. Once IPSec and non-IPSec traffic are separated into different receive or transmit queues, the processor handles the non-IPSec traffic, while the IPSec traffic is processed in parallel by a hardware IPSec assist component which performs the IPSec functions of encryption, decryption, Security Association (SA) management and key exchange.

BRIEF DESCRIPTION OF THE DRAWINGS

The present invention is better understood by reading the following detailed description of the invention in conjunction with the accompanying drawings, wherein:

FIGS. 10A–10C illustrates the location of the MAC header, type field and IP header protocol field for various frame types.

DETAILED DESCRIPTION OF THE INVENTION

The following detailed description of the present invention is provided as a detailed, enabling teaching of the present invention in its best currently-known embodiment. Those skilled in the relevant arts will recognize that many changes can be made to the embodiment described while still obtaining the beneficial results of the present invention. It will also be apparent that some of the desired benefits of the present invention can be obtained by selecting some of the features of the present invention without using other features. Accordingly, those who work in the art will realize that many modifications and adaptations to the present invention are possible and may even be desirable in certain circumstances and are a part of the present invention. Thus, the following description is provided as illustrative of the principles of the present invention and not in limitation thereof, since the scope of the present patent is defined by the appended claims.

Figure 1:
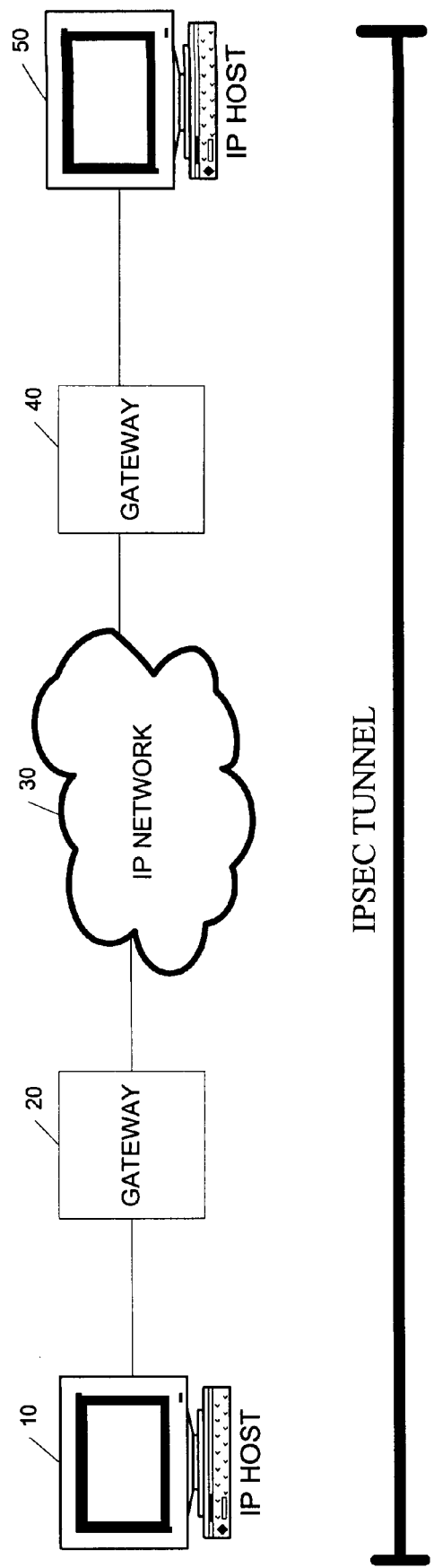
FIG. 1 illustrates an end-to-end IPSec tunneling model, allowing an IP host at one end of the network to communicate securely with an IP host at the other end of the network.

IPSec defines a tunnel mechanism to securely transport IP traffic across a public IP network. IPSec tunnels are actually implemented using a pair of tunnels. There is an IPSec key management and an IPSec data management tunnel. An IPSec key management tunnel is often referred to as an Internet Key Exchange (IKE) tunnel or an IPSec Phase I tunnel and is a control tunnel for one or more follow-on IPSec Phase II user-data tunnels. IPSec tunnels are commonly implemented in either an end-to-end or gateway-to-gateway network model. End-to-end IPSec tunneling allows an IP host at one end of the network to securely communicate with an IP host at the other end of the network. This model is similar to a specific peer-to-peer model and requires both IP hosts to be IPSec enabled. The IPSec tunnel is made up of one key management tunnel and one data management tunnel between the two IP hosts. FIG. 1 illustrates the IPSec end-to-end tunneling model An IPSec tunnel is created between IP host 10 and IP host 50, each connected by a gateway 20, 40 respectively over IP network 30.

Figure 2:
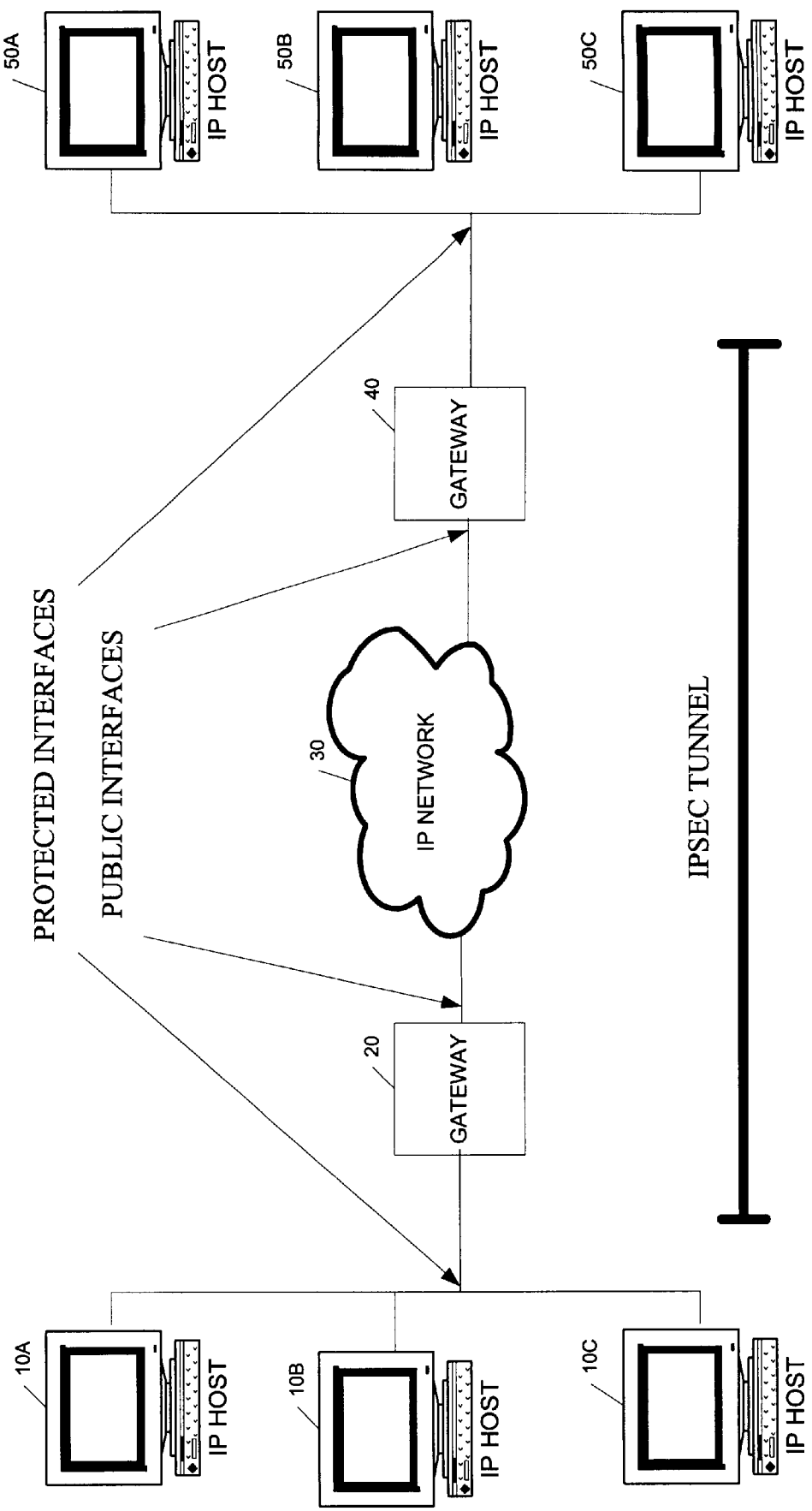
FIG. 2 illustrates a gateway-to-gateway IPSec tunneling model, allowing one or more IP hosts at one end of the network to communicate securely with one or more IP hosts at the other end of the network.

Gateway-to-gateway IPSec tunneling allows one or more IP hosts at one end of the network to securely communicate with one or more IP hosts at the other end of the network. This model is similar to an any-to-any model in which the gateways must be IPSec enabled, but none of the IP hosts need to be IPSec enabled. The IPSec tunnel is made of one key management tunnel and one or more data management tunnels between the two gateways. The gateways connect over their public interface and protect one or more private interfaces behind them. A private interface may be an IP-subnet, range of IP addresses or a single IP address. FIG. 2 illustrates the IPSec gateway-to-gateway tunneling model between gateways 20, 40 over IP network 30. Gateway 20 connects to IP hosts 10A, 10B, 10C over a protected interface. Likewise, gateway 40 connects to IP hosts 50A, 50B, 50C over another protected interface.

The Internet Key Exchange (IKE) process is used to establish the tunnels in a tunnel definition database as established in the documents setting up such communications protocols such as those provided by the IETF. Requests for Comments (RFC) 2401, "Security Architecture for the Internet Protocol" and Request for Comments (RFC) 2409, "The Internet Key Exchange (IKE)", both published in November 1998 are hereby incorporated by reference herein.

Figure 3:
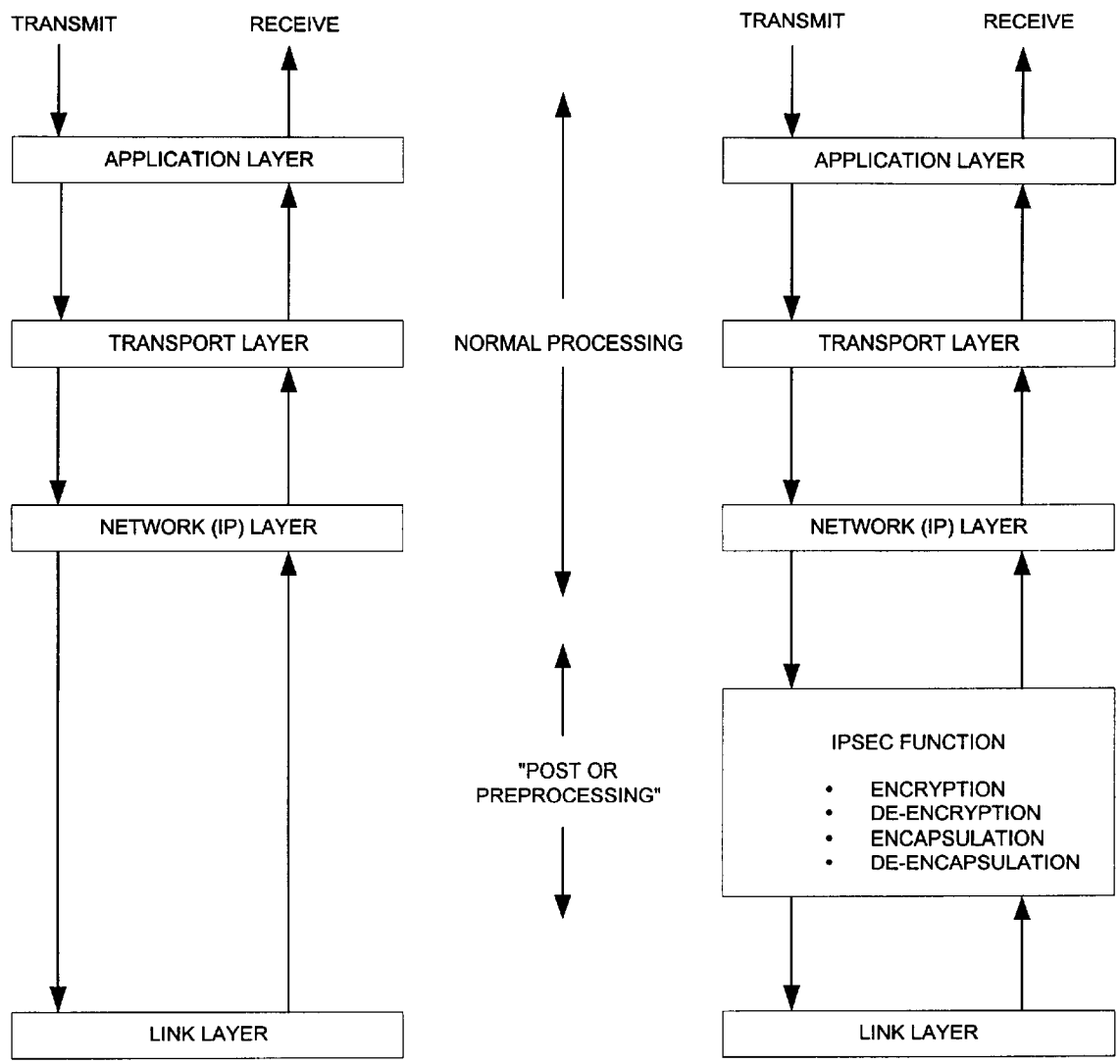
FIG. 3 illustrates the Transmission Control Protocol/Internet Protocol (TCP/IP) protocol stack depicting data flow both without and with IPSec.
Figure 4:
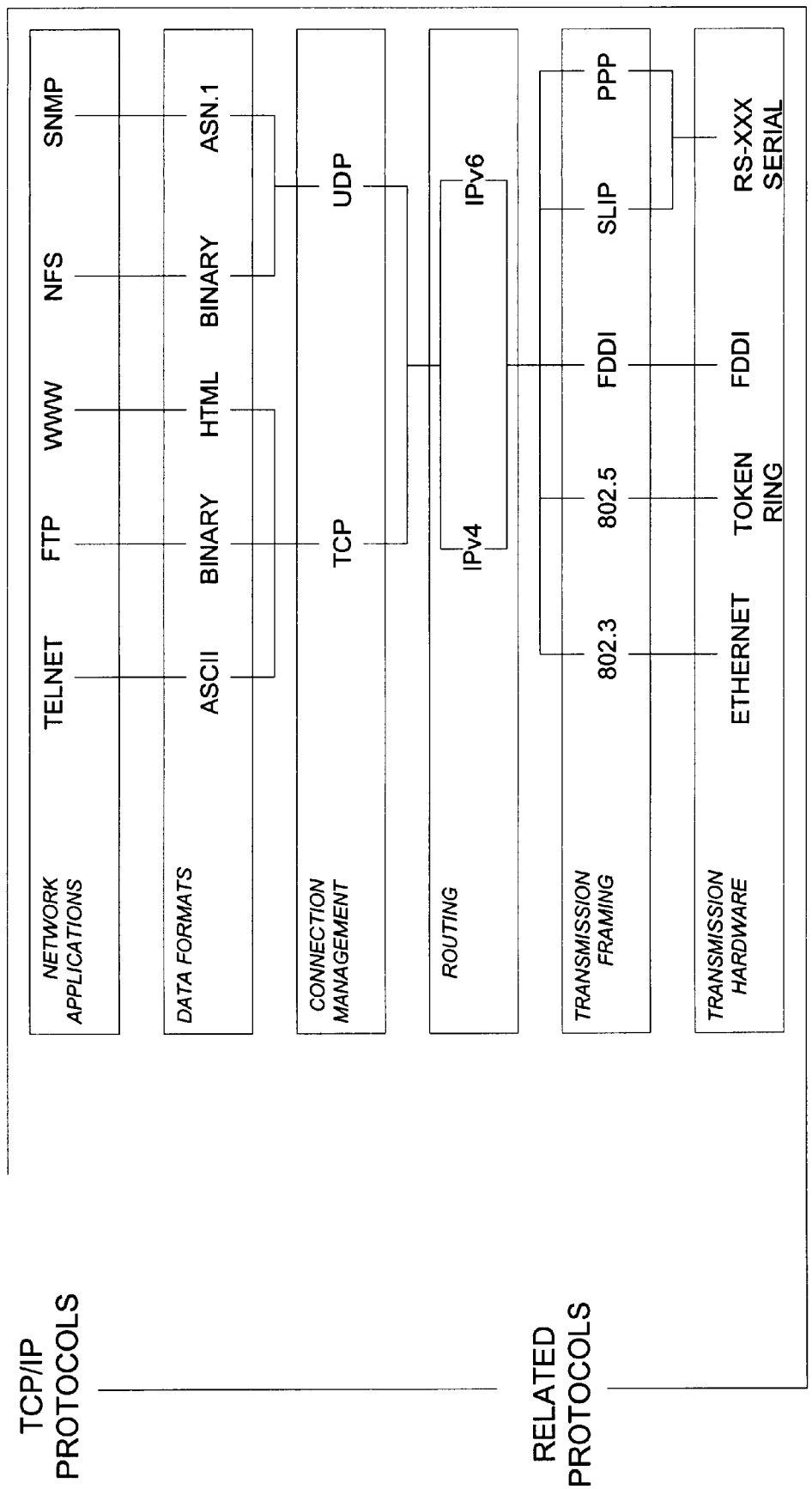
FIG. 4 illustrates TCP/IP protocols and related protocols associated with the TCP/IP protocol stack of FIG. 3.

FIG. 3 illustrates the Transmission Control Protocol/Internet Protocol (TCP/IP) protocol stack which is layered as shown on the left side of the figure. The application layer is a user process cooperating with another process on the same or on a different host. Some examples are illustrated in FIG., 4. These include TELNET (protocol for remote terminal connections), FTP (file transfer protocol), WWW (world wide web), NFS (network file system), and SNMP (Simple Network Management Protocol). The transport layer provides the end-to-end data transfer. Example protocols shown in FIG. 4 are TCP, which is connection-oriented and UDP (User Datagram Protocol). The network layer provides the virtual network image of the Internet, i.e., this layer shields the higher levels from the typical network architecture below it. IP (IPv4, IPv6) is the most important protocol here. It does not provide reliability, flow control or error recovery, and also does not assume reliability from the lower layers. It is a connectionless protocol. The link layer is the interface to the actual network hardware. Examples illustrated in FIG. 4 are IEEE 802.2 standard for token ring local area networks and IEEE 802.3 standard for collision detection type networks such as Ethernet.

The right-hand side of FIG. 3 shows data flow with IPSec. In particular, it shows the preprocessing or postprocessing that is performed by the IPSec function, including encryption, decryption, encapsulation and decapsulation. The large processing requirement for data flow including IPSec traffic significantly reduces the overall system performance. Among the many options available within IPSec is an "enveloping option" which is the most likely option to be used. With this option, a transmitted data frame after "normal" processing is "postprocessed", by either encapsulating the original IP protocol data unit (PDU) inside an additional IP PDU, or encrypting some portions of the PDU or both. The inverse process occurs when the data frame is received.

In practice, IPSec data traffic is intermixed with other data traffic, requiring the network layer to determine if the frame is an IP frame and then have the IP layer determine if the frame is an IPSec frame. If it is, then the previously described postprocessing or preprocessing is done prior to the normal IP processing. This check and the IPSec function can significantly decrease the overall performance of the system.

Figure 5:
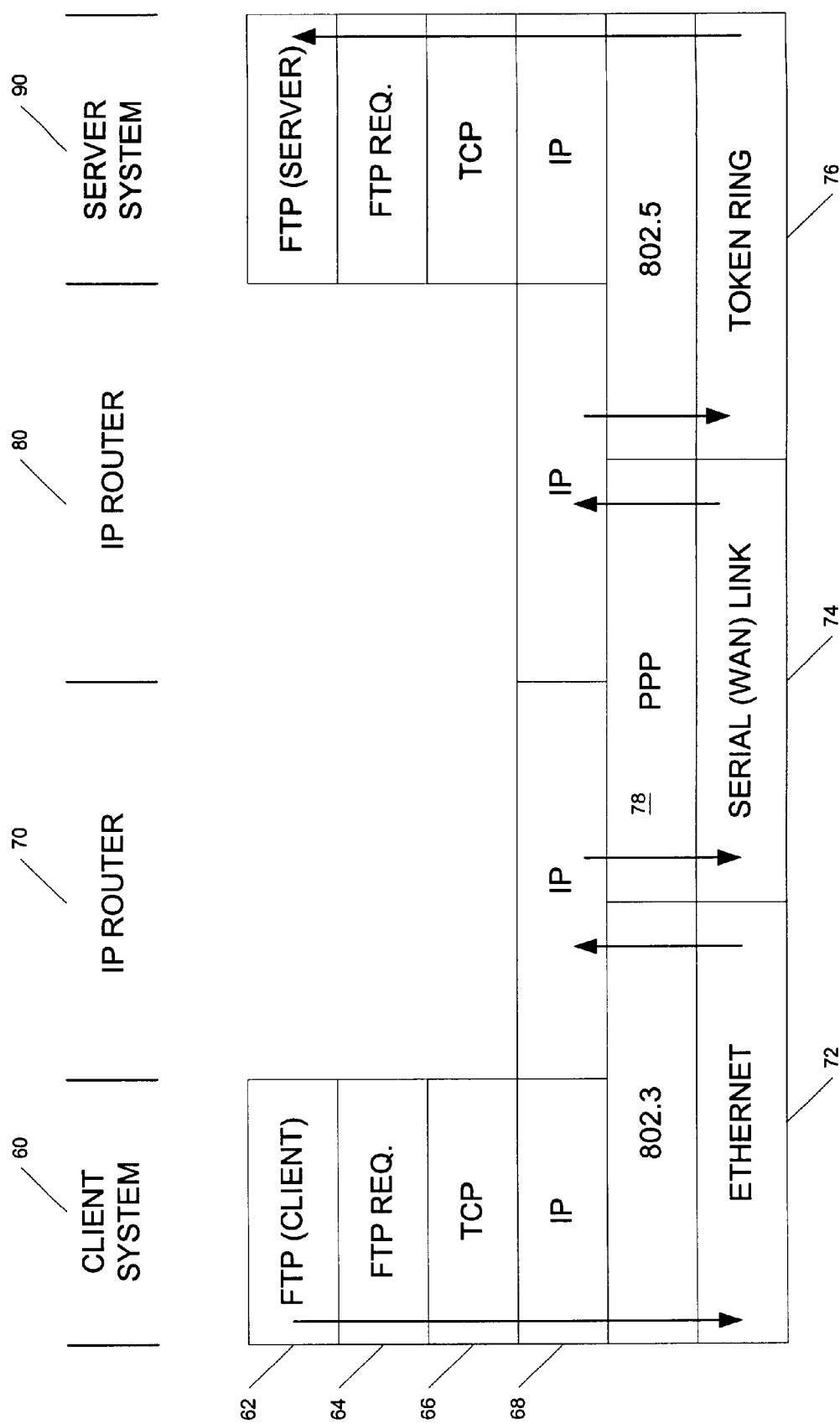
FIG. 5 illustrates the processing of a request from a client system to a server system using TCP/IP.

FIG. 5 illustrates a situation in which a user runs a file transfer protocol (FTP) application on a client computer 60 and requests a file to be downloaded from an FTP server 90. The client system's FTP application 62 and its underlining TCP/IP protocol stack software formulate an FTP protocol request 64, encapsulate the request within one or more transmission control protocol (TCP) packets 66 to ensure its acknowledged delivery, encapsulate each resultant TCP packet within an IP 68 packet, which includes the network address of the FTP server 90, and depending upon the underlying LAN 72, 76 or WAN 74 network hardware, encapsulate each IP packet within an appropriate frame for transmission. The corresponding TCP/IP protocol stack on a server decapsulates the incoming frame and acts on the request it contains. Later, the FTP server 90 delivers the requested file to the client 60 by similarly encapsulating and transmitting it through the network. FIG. 5 also shows two IP routers 70, 80 interconnecting the client's and server's LANs 72, 76 through an intermediate WAN link 74, using the Point-to-Point Protocol (PPP).

Figure 6:
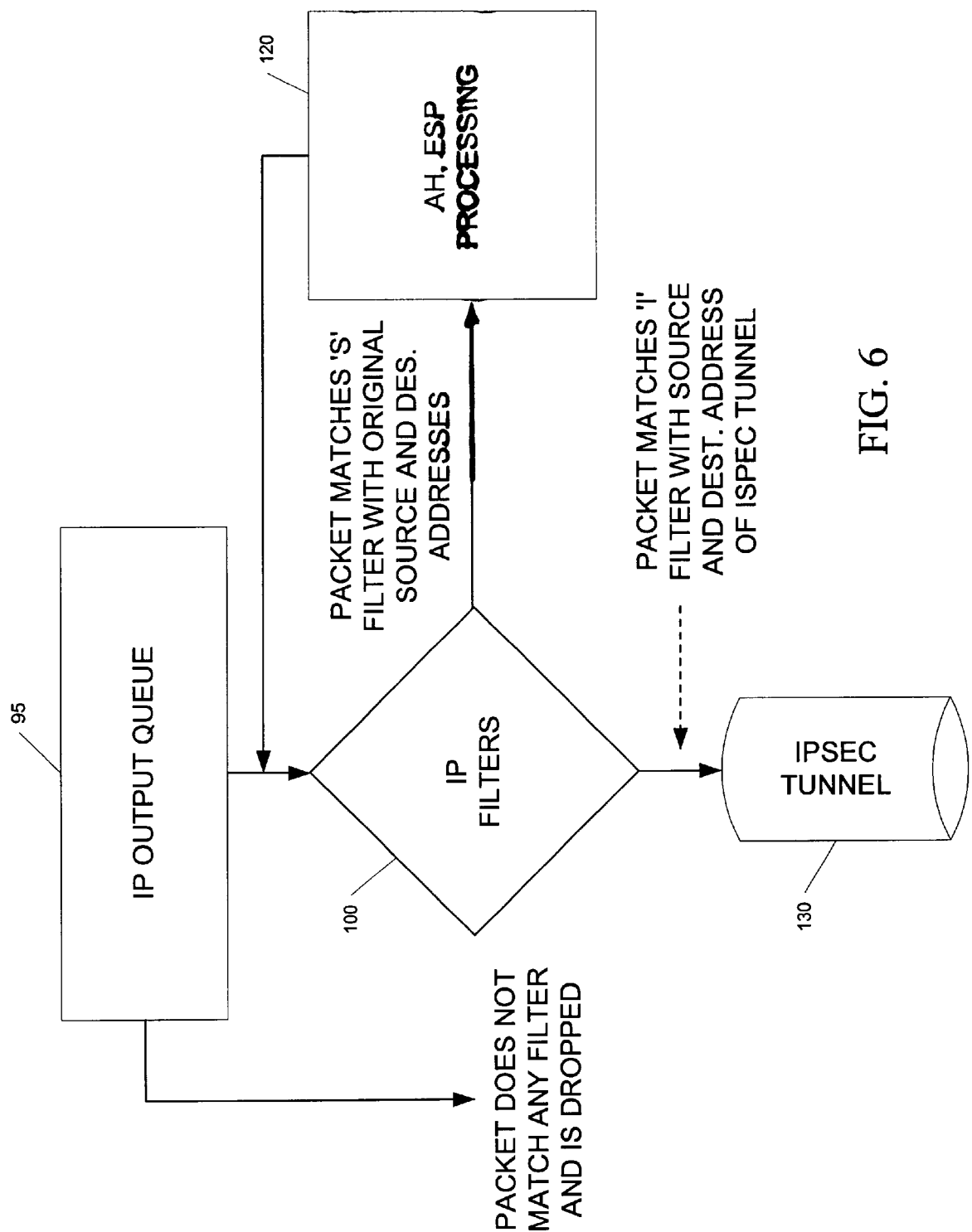
FIG. 6 illustrates the use of packet filtering to process outbound IPSec packets at the network layer.

The IPSec architecture defines a Security Policy Database (SPD) that is used to determine which packets should be processed by IPSec. The IPSec implementation in routers uses a packet filter function as the key element of the SPD. IPSec uses packet filters to tunnel the packets into and out of the IPSec engine. Both inbound and outbound packet filters are used for this purpose, although they work slightly differently in each direction. FIG. 6 shows conceptually how the process works for IP packets in the outbound direction.

As depicted in FIG. 6, just before the outbound IP packets leave the router interface, they are tested by the packet filter 100 for that interface. A packet filter 100 is a list of rules (called access controls) used by the router to control the processing of individual packets on an interface. A packet filter 100 is defined for the inbound direction and another packet filter is defined for the outbound direction for each interface on the router. An access control type of 'I' (inclusive), means that the filter is an inclusive filter. In this case, any matched packets will be allowed to proceed through the interface. An access control of type 'E' (exclusive) means the packet filter is an exclusive filter. In this case, any matched packets are dropped from the interface. An access control type of 'S' is another inclusive packet filter. When a match is encountered on an 'S' filter, the packet is passed to the IPSec engine 120 for processing by the AH and ESP protocols. An access control of 'N' is another inclusive packet filter. When a match is encountered on an 'N' filter, the packet is passed to a network address translation function for processing.

The packet from IP Output Queue 95 is compared to each access control and the access control list (ACL) for the packet filter one-by-one. If a match is found on an 'S' type access control, the packet is passed to the IPSec engine 120 for AH/ESP processing. After IPSec has processed the packet, it puts the packet back through the filter 100 again. This time, the packet must match an inclusive access control (type 'I') in order for the router to send the packet out on the interface to IPSec tunnel 130. If a packet does not match any access control in the list, then the packet is dropped from the interface.

In addition to the outbound filter, a packet filter must also be defined for the inbound direction. Like the outbound filter 100, the inbound filter needs two access controls. However, the purpose of the access filters is slightly different for the inbound direction.

Figure 7:
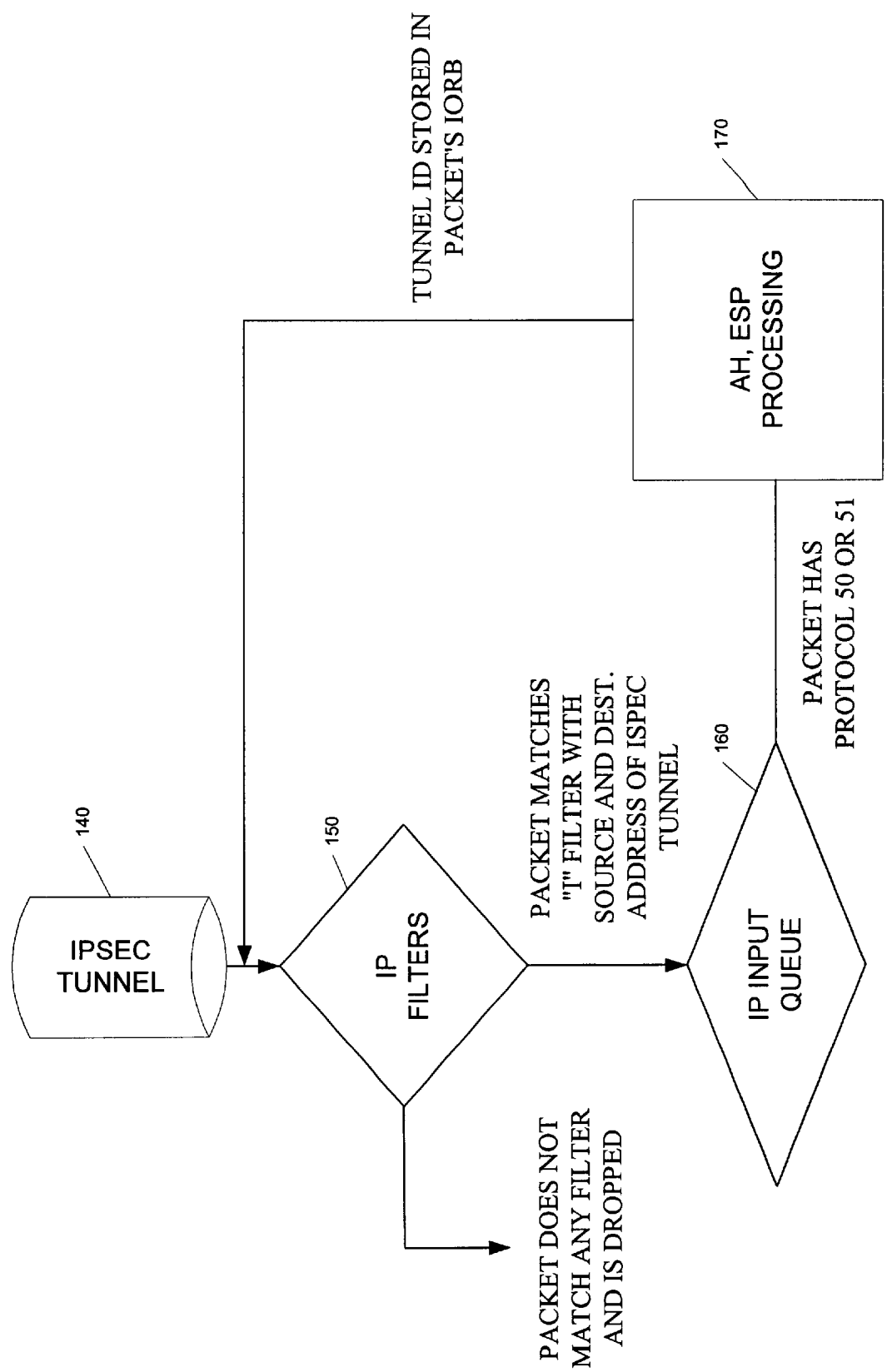
FIG. 7 illustrates the use of packet filtering to process inbound IPSec packets at the network layer.

As packets come into the interface through IPSec tunnel 140, as shown in FIG. 7, the process that was used in the outbound direction at the ingress of the IPSec tunnel needs to be reversed. As can be seen in the figure, the packet must first match in packet filter 150 an access control of type 'I' with source and destination addresses of the IPSec tunnel endpoints. When using IPSec in tunnel mode, the packets get encapsulated with a new IP header. The source and destination addresses that get put into this new header are the tunnel starting and ending points. Following the packet match, the packet is placed in IP Input Queue (IPQ) 160.

This control also specifies IPSec protocols 50 (ESP) and 51 (AH), but for the purpose of checking to ensure that they really are IPSec packets. The packets get routed to the IPSec engine 170 by the protocol demultiplexer logic when that function sees that they have a protocol field of 50 or 51. This works identically to the way a TCP or UDP packet gets routed to the TCP or UDP code.

Figure 8:
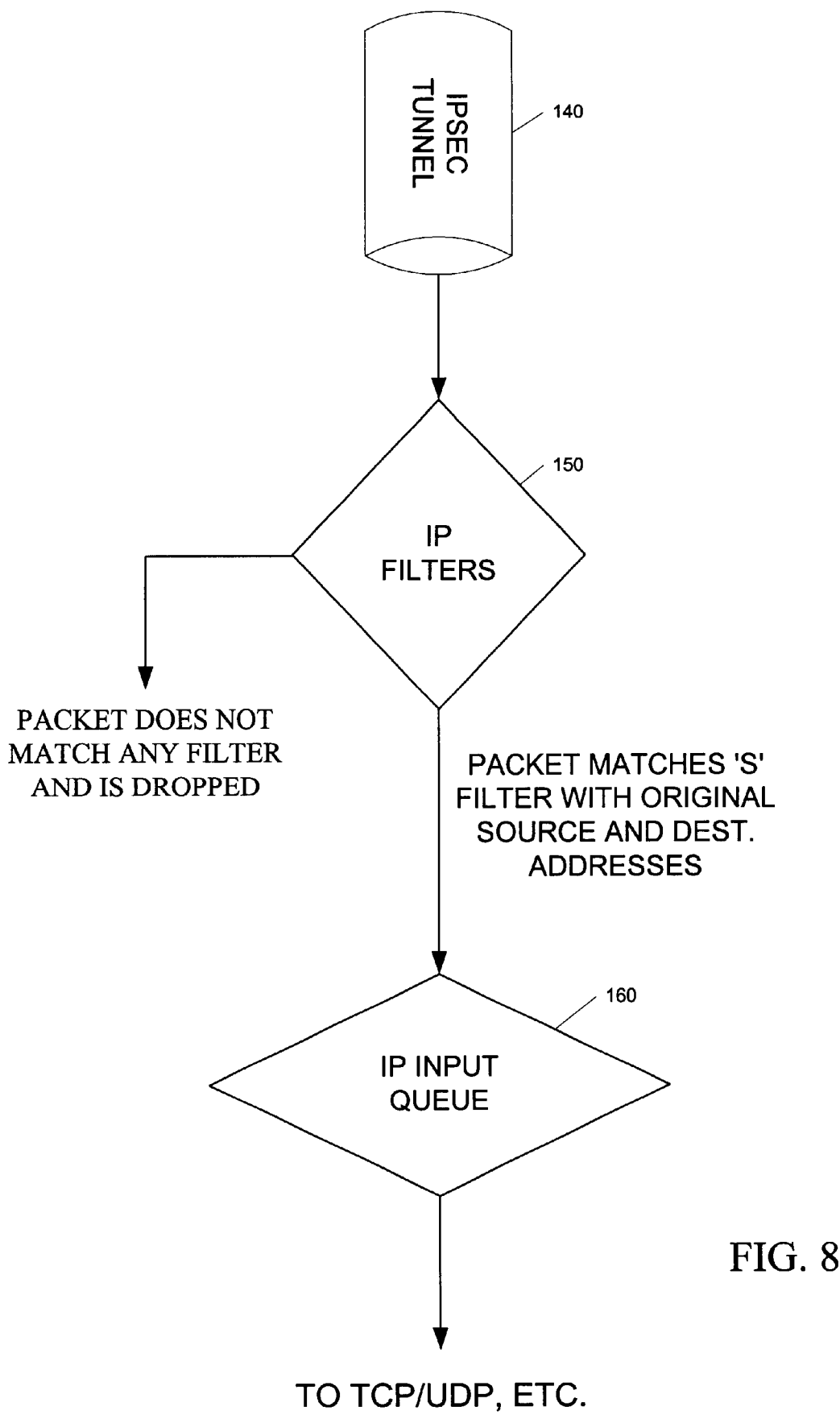
FIG. 8 illustrates the use of packet filtering to process inbound IPSec packets after routing through an IPSec engine.

When the packet is passed to the IPSec engine 170, the AH and ESP headers are processed. The packet is authenticated and/or decrypted and the tunnel ID is stored in the packets' iorb. The packet is then sent back through the packet filters 150 in the same manner as for the outbound direction flow. The second time through, the packet needs to match a control of type 'S' as illustrated in FIG. 8. When this occurs, the IP filter 150 checks the tunnel ID that was received with the IPSec packet against the ID that was configured in the access control. These two tunnel IDs have to match or the packet is dropped. If they match, the packet is allowed to proceed to either the local IPQ 160 if the decapsulated packet is for local services, such as TCP, or is routed to another interface.

Unlike this current methodology for IPSec packet filtering at the network layer, the present invention utilizes a function in the data link layer that determines if the received frame is an IP frame requiring IPSec processing; and if so, places the frame on a separate receive queue, i.e., not the normal receive queue. This data link layer function is the subject of the co-pending patent application identified previously. This is especially important in high speed network interface cards (NIC) such as High Speed Token-Ring, Gigabit Token-Ring, Fast Ethernet, and Gigabit Ethernet. These NIC cards are most frequently used in server devices.

By moving the layer-3 determination of whether a receive frame is an IP frame requiring IPSec processing, from the network layer into the data link layer and placing these frames on a separate receive queue, system performance can be significantly enhanced. This is illustrated in FIG. 9.

Figure 9:
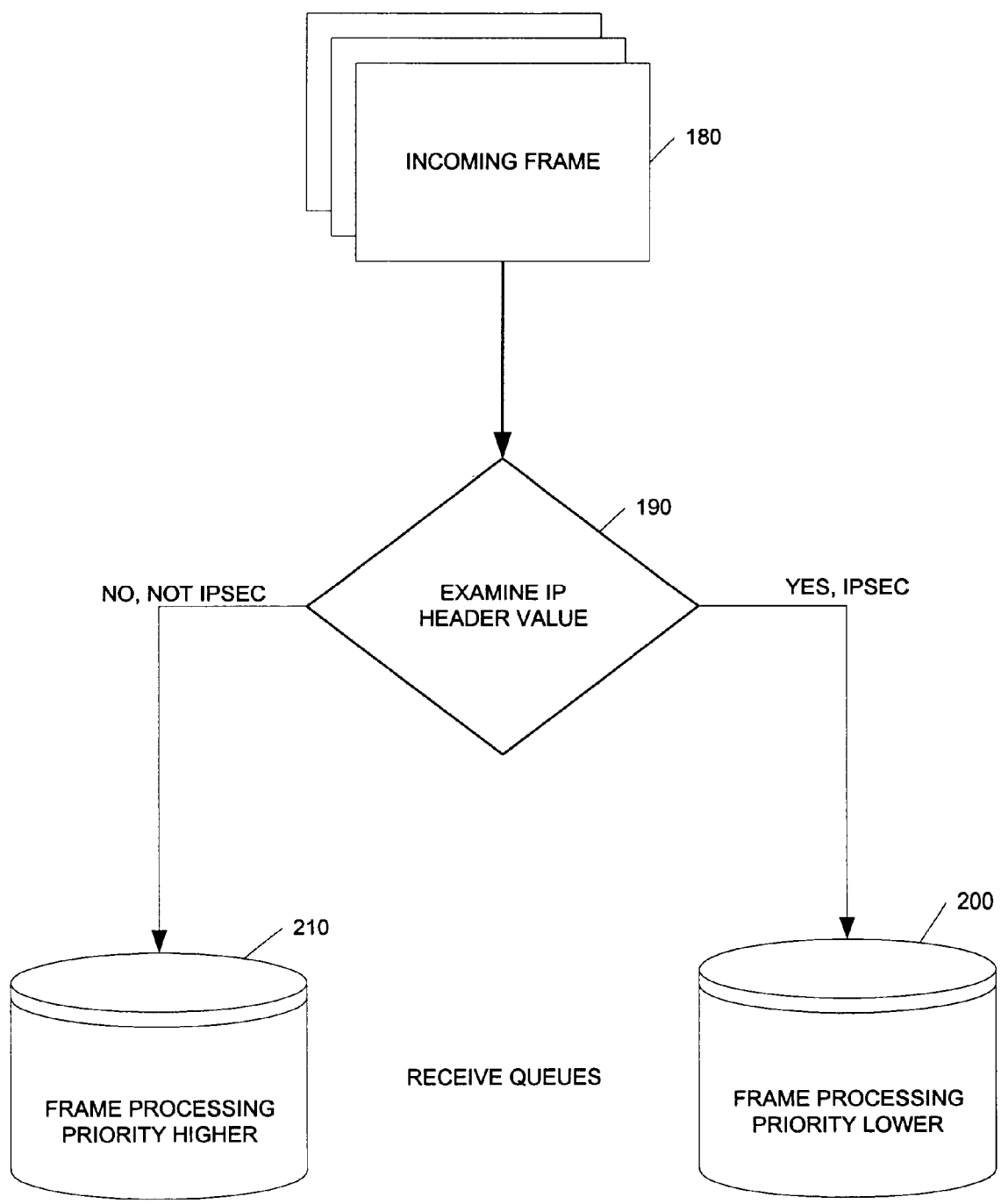
FIG. 9 illustrates the processing of incoming frames at the data link layer.

FIG. 9 shows incoming frames 180. The IP header value in the incoming frame is examined 190 to determine whether or not the data frame is an IPSec frame. If it is, then the frame is placed on receive queue 200 for frame processing with a lower priority. Otherwise, if the frame is not an IPSec frame, the data frame is placed on the regular receive queue 210 for frame processing with a higher priority. Outbound data frames are handled in a similar manner with IPSec frames being placed on a lower priority transmit queue for frame processing.

The system can, with knowledge of the receive queues 200, 210, substantially improve management of the receive process to enhance system performance. It enables a receive queue discipline of processing the shortest job first. In other words, given that the system has received queue type awareness, in general terms, it can prioritize the quickly processed data from receive queue 210 in front of the slowly processed data from receive queue 200, substantially lowering the average wait and process time of the system.

Specifically, given that the system has receive-queue type awareness and given that IPSec frames require substantially more processing than non-IPSec frames, the system can service the non-IPSec frame on a priority basis, thus preventing blocking, from a processing point of view, of non-IPSec frames by IPSec frames. This reduces the average frame processing time. To determine if the frame is an IPSec frame, the frame must be examined at two points—the type field in the MAC header and the protocol field in the IP header. The type field in the MAC header must be type hexadecimal '0800', i.e., IP. The protocol field in the IP header must be type 50 or 51, i.e., IPSec in either tunnel or transport mode.

The location of the type and protocol fields for various frame types are illustrated in FIGS. 10A, 10B, and 10C. FIG. 10A depicts an IEEE 802.2/802.3 frame (RFC 1042). FIG. 10B illustrates an Ethernet frame (RFC 894). FIG. 10C illustrates a token-ring frame (IEEE 802.5). IEEE 802 is a set of standards developed by the Institute of Electrical and Electronic Engineers for local area networks (LANs). IEEE 802.2 is a data link control standard. IEEE 802.3 to 802.6 are medium access control (MAC) standards referring to Carrier Sense Multiple Access with Collision Detection (CSMA/CD), token bus, token ring, and dual bus systems, respectively. The 802.3 standard is essentially the same as Ethernet, using unslotted persistent CSMA/CD with binary exponential back off. The 802.2 Logical Link Control (LLC) layer above IEEE 802.3 uses a concept known as Link Service Access Point (LSAP) which uses a three byte header. Due to a growing number of applications using IEEE 802 as lower protocol layers, an extension was made to the IEEE 802.2 protocol in the form of a Sub-Network Access Protocol (SNAP). It is an extension to the LSAP header and its use is indicated by the value 170 in the first and second bytes of the LSAP frame.

IPSec (IP Security) traffic requires very significant processing for encryption/decryption and key exchange. The co-pending patent application describes the method for use by a NIC that finds and sorts traffic of this type, saves it in a separate queue for preprocessing or postprocessing, such that performance of intermixed IP and IPSec traffic can be improved. Even with this improvement, the present invention provides further enhancements to handling IPSec traffic such that even less system overhead is consumed. By using a hardware-based process to service the IPSec queue separately and to perform preprocessing or postprocessing before returning the IPSec frame to the normal IP queue for further processing, system overhead can be reduced, and system performance improved further.

As described above, current solutions include those where such processing is done at the network layer level, or those where general layer-3 processing has been moved into the hardware. In systems where processing of IPSec traffic has been moved into hardware, traffic is processed in a serial manner, i.e., traffic is processed serially and non-encrypted traffic can be delayed until encrypted traffic is processed. The present invention separates traffic of a particular type (in this case, IPSec traffic) into separate receive/transmit queues, and then preprocesses/postprocesses this traffic in parallel using a separate hardware assist component.

Figure 11:
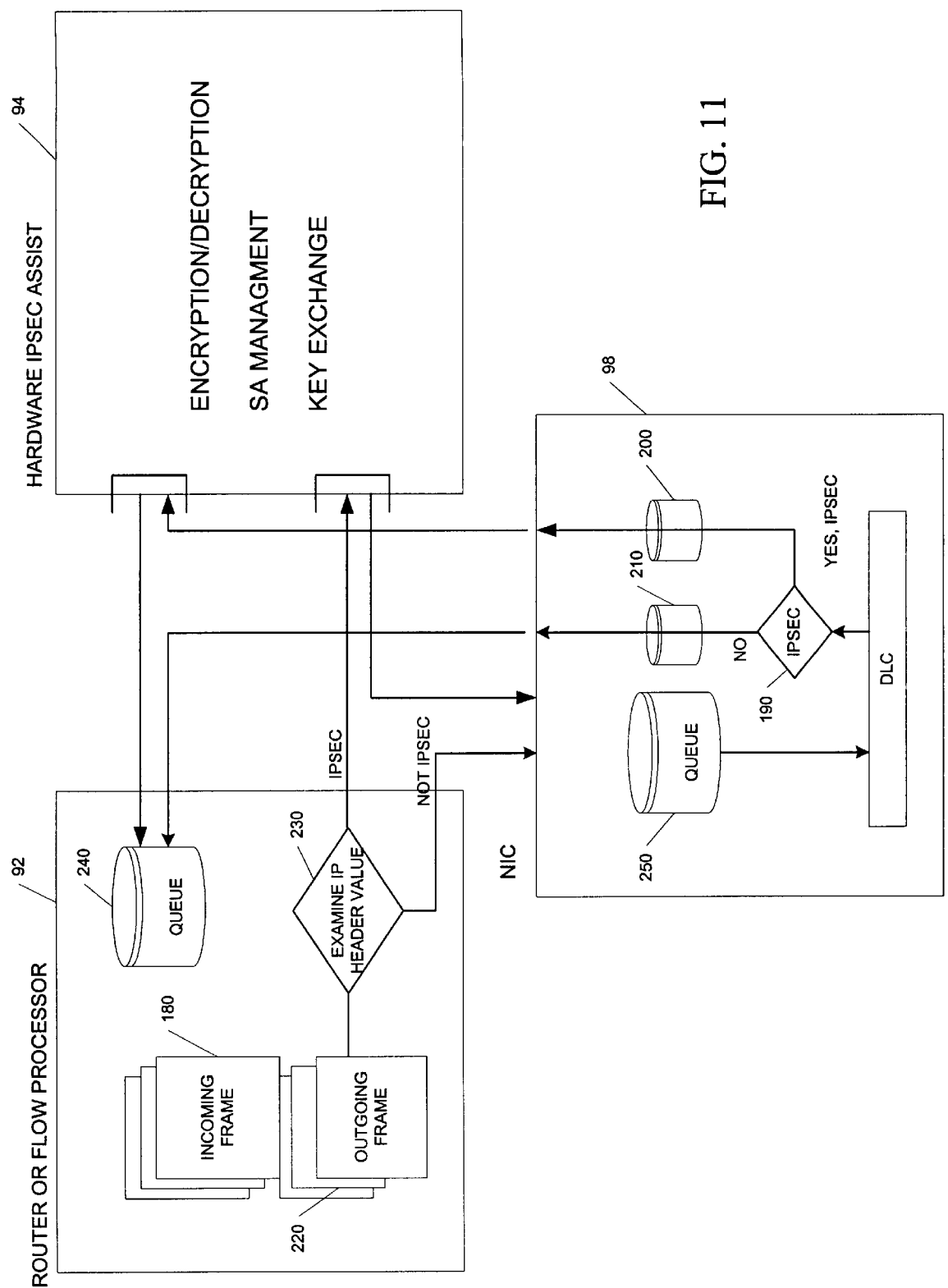
FIG. 11 illustrates the hardware components used in an embodiment of the invention to separate IPSec frames and to process them in parallel with non-IPSec frames.

FIG. 11 illustrates the hardware components needed to transport traffic through the network device which are partitioned into three blocks—a NIC card 98, a hardware IPSec assist component 94 and a router/flow processor 92. The present invention uses a separate hardware assist component for the inbound/outbound IPSec traffic operating on separate queues, where the IPSec traffic is processed independently of non-IPSec traffic. This hardware assist component processes an IPSec frame only after the frame is identified as having an IPSec identifier. The functions performed by the hardware assist component 94 includes encryption/decryption of data frames, security association management and key exchange. Performance is further enhanced by going directly from the NIC to the IP hardware assist component, rather than going to the processor first, then to the hardware assist function and back to the processor. The IPSec frame identification is performed as indicated in the decision blocks 190, 230 depicted in FIG. 11.

Servers for which system performance may not be of the highest order, such as a PC server, can benefit significantly by moving traffic queue management of processing-intensive traffic out of the mainstream path. Higher performance servers can also benefit. Furthermore, by providing the separate receive/transmit queues for IPSec traffic and moving the preprocessing/postprocessing off the network device processor, there can be significant savings in terms of the system processing overhead in the server.

In one embodiment of the invention, processing of frames of the same type (non-IPSec or IPSec) is maintained in the order received (i.e., each frame is placed on a FIFO queue). If the entire serial stream order (i.e., mix of non-IPSec and IPSec frames) is to be maintained sequentially, then the two queues have to be gated properly. Such gating is considered an additional feature of the present invention.

The present invention can be realized in hardware, software, or a combination of hardware and software. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Additionally, the corresponding structures, materials, acts and equivalents of any means plus Function elements in the claims below are intended to include any structure, material, or acts for performing the functions in combination with other claimed elements as specifically claimed.

While the invention has been particularly shown and described with reference to a preferred embodiment thereof, it will be understood by those skilled in the art that various changes in form and detail may be made without departing from the spirit and scope of the present invention.

What is claimed is:

1. A system for enhancing the performance of a network device in a communications network wherein the network device processes a plurality of data frame traffic of various types, comprising:
   a network interface card including a data link layer component that determines if a data frame has a security extension associated with it and places each data frame with an associated security extension on a separate processing queue;
   a hardware assist component that processes each data frame with a security extension on the separate processing queue; and
   a processor component that processes each data frame not having a security extension in parallel with the processing that is performed by the hardware assist component.

2. The system for enhancing the performance of a network device in a communications network of claim 1 further comprising:
   a higher priority frame processing receive queue for placing incoming data frames without a security extension for normal data frame processing by the processor component; and
   a lower priority frame processing receive queue for placing incoming data frames with a security extension for preprocessing of the security extension by the hardware assist component.

3. The system for enhancing the performance of a network device in a communications network of claim 1 further comprising:
   a higher priority frame processing transmit queue for placing outbound data frames without a security extension for normal data frame processing by the processor component; and
   a lower priority frame processing transmit queue for placing outbound data frames with a security extension for postprocessing of the security extension by the hardware assist component.

4. The system for enhancing the performance of a network device in a communications network of claim 1 wherein the data link layer component further comprises a logic component that evaluates whether the data frame has the security extension by first evaluating a Media Access Control (MAC) address of the data frame to determine if the data frame has an Internet Protocol (IP) header, and then evaluates the data frame's IP header to determine if the data frame has a security extension for the data frame.

5. The system for enhancing the performance of a network device in a communications network of claim 4 wherein the value in the type field in the MAC header is hexadecimal '0800'.

6. The system for enhancing the performance of a network device in a communications network of claim 5 wherein a value in a protocol field of the IP header is hexadecimal '50' or '51' represents an IP Security (IPSec) data frame in tunnel mode or transport mode.

7. The system for enhancing the performance of a network device in a communications network of claim 1 wherein network interface card is a High Speed Token Ring or a Gigabit Token-Ring.

8. The system for enhancing the performance of a network device in a communications network of claim 1 wherein the data frames are Token-Ring frames.

9. The system for enhancing the performance of a network device in a communications network of claim 2 wherein the preprocessing of the security extension by the hardware assist component for the incoming data frames includes decapsulation and decryption of the data frames.

10. The system for enhancing the performance of a network device in a communications network of claim 3 wherein the postprocessing of the security extension by the hardware assist component for the outbound data frames includes encryption and encapsulation of the data frames.

11. The system for enhancing the performance of a network device in a communications network of claim 1 wherein the network device is any one of a server computer, a client computer, a router, a switch, a hub and a network processor.

12. The system for enhancing the performance of a network device in a communications network of claim 1 wherein the hardware assist component provides security association management for data frames having a security extension.

13. The system for enhancing the performance of a network device in a communications network of claim 1 wherein the hardware assist component performs a key exchange with another network device associate with an establishment of a security tunnel between the network devices.

14. A method for enhancing the performance of a network device in a communications network wherein the network device processes a plurality of data frame traffic of various types, comprising the acts of:

determining, by a data link layer component of network interface card, if a data frame has a security extension associated with it;

placing each data frame with an associated security extension on a separate processing queue from, each data frame without a security extension;

processing each data frame with a security extension on the separate processing queues by a hardware assist component; and processing each data frame not having a security extension by a processor component in parallel with the processing that is performed by the hardware assist component.

15. The method for enhancing the performance of a network device in a communications network of claim 14 further comprising the acts of:

placing incoming data frames without a security extension on a higher priority frame processing receive queue for normal data frame processing by the processor component; and placing incoming data frames with a security extension on a lower priority frame processing receive queue for preprocessing of the security extension by the hardware assist component.

16. The method for enhancing the performance of a network device in a communications network of claim 14 further comprising:

placing outbound data frames without a security extension on a higher priority frame processing transmit queue for normal data frame processing by the processor component; and placing outbound data frames with a security extension on a lower priority frame processing queue transmit queue for postprocessing of the security extension by the hardware assist component.

17. The method for enhancing the performance of a network device in a communications network of claim 14 wherein the act of determining by the data link layer component further comprises determining whether the data frame has the security extension by first evaluating a Media Access Control (MAC) address of the data frame to determine if the data frame has an Internet Protocol (1P) header, and then evaluating the data frame's IP header to determine if the data frame has a security extension for the data frame.

18. The method for enhancing the performance of a network device in a communications network of claim 17 wherein the value in the type field in the MAC header is hexadecimal '0800'.

19. The method for enhancing the performance of a network device in a communications network of claim 17 wherein a value in a protocol field of the IP header is hexadecimal '50' or '51' represents an IP Security (IPSec) data frame in tunnel mode or transport mode.

20. The method for enhancing the performance of a network device in a communications network of claim 14 wherein the network interface card is a High Speed Token-Ring or a Gigabit Token-Ring.

21. The method for enhancing the performance of a network device in a communication network of claim 14 wherein the data frames are Token-Ring frames.

22. The method for enhancing the performance of a network device in a communications network of claim 15 wherein the preprocessing of the security extension by the hardware assist component for the incoming data frames includes decapsulation and decryption of the data frames.

23. The method for enhancing the performance of a network device in a communications network of claim 16 wherein the postprocessing of the security extension by the hardware assist component for the outbound data frames includes encryption and encapsulation of the data frames.

24. The method for enhancing the performance of a network device in a communications network of claim 14 wherein the network device is any one of a server computer, a client computer, a router, a switch, a hub and a network processor.

25. The method for enhancing the performance of a network device in a communications network of claim 14 further comprising providing security association management by the hardware assist component for data frames having a security extension.

26. The method for enhancing the performance of a network device in a communications network of claim 14 further comprising performing a key exchange with another network device associated with an establishment of a security tunnel between the network devices.

27. A computer readable medium containing instructions for enhancing the performance of a network device in a communications network wherein the network device processes a plurality of data frame traffic of various types, by:

determining, by a data link layer component of a network interface card, if a data frame has a security extension associated with it;

placing each data frame with an associated security extension on a separate processing queue from each data frame without a security extension;

processing each data frame with a security extension on a separate processing queue; and processing each data frame not having a security extension by a processor component in parallel with the processing that is performed by the hardware assist component.

28. The computer readable medium containing instructions for enhancing the performance of a network device in a communications network of claim 27, by:

placing incoming data frames without a security extension on a higher priority frame processing receive queue for normal data frame processing; and placing incoming data frames with a security extension for preprocessing of the security extension on a lower priority frame processing receive queue.

29. The computer readable medium containing instructions for enhancing the performance of a network device in a communications network of claim 27, by:

placing outbound data frames without a security extension on a higher priority frame processing transmit queue for normal data frame processing; and placing outbound data frames with a security extension for postprocessing of the security extension on a lower priority frame processing transmit queue.

30. The computer readable medium containing instructions for enhancing the performance of a network device in a communications network of claim 27, by evaluating whether the data frame has the security extension by first evaluating a Media Access Control (MAC) address of the data frame to determine if the data frame has an Internet Protocol (IP) header, and then evaluating the data frame's IP header to determine if the data frame has a security extension for the data frame.

31. The computer readable medium containing instructions for enhancing the performance of a network device in a communications network of claim 30 wherein the value in the type field in the MAC header is hexadecimal '0800'.

32. The computer readable medium containing instructions for enhancing the performance of a network device in a communications network of claim wherein the value in the protocol field of the IP header is hexadecimal is '50' or '51' represents an IP Security (IPSec) data frame in tunnel mode or transport mode.

33. The computer readable medium containing instructions for enhancing the performance of a network device in a communications network of claim 27 wherein the data frames are Token-Ring frames.

34. The computer readable medium containing instructions for enhancing the performance of a network device in a communications network of claim 28 wherein the preprocessing of the security extension for the incoming data frames includes decapsulation and decryption of the data frames.

35. The computer readable medium containing instructions for enhancing the performance of a network device in a communications network of claim 29 wherein the post-processing of the security extension for the outbound data frames includes encryption and encapsulation of the data frames.

36. The computer readable medium containing instructions for enhancing the performance of a network device in a communications network of claim 27, by providing security association management by the hardware assist component.

37. The computer readable medium containing instructions for enhancing the performance of a network device in a communications network of claim 27, by performing a key exchange with another network device associated with an establishment of a security tunnel between the network devices.

* * * * *